(12) United States Patent
Cavagna

(10) Patent No.: US 9,169,953 B2
(45) Date of Patent: Oct. 27, 2015

(54) DIELECTRIC FITTING

(71) Applicant: Savio Cavagna, Brescia (IT)

(72) Inventor: Savio Cavagna, Brescia (IT)

(73) Assignee: Cavagna Group S.p.A., Ponte S. Marco di Calcinato (BS) (IL)

( * ) Notice: Subject to any disclaimer, the term of this patent is extended or adjusted under 35 U.S.C. 154(b) by 157 days.

(21) Appl. No.: 13/759,493

(22) Filed: Feb. 5, 2013

(65) Prior Publication Data

US 2013/0207377 A1  Aug. 15, 2013

Related U.S. Application Data

(60) Provisional application No. 61/596,763, filed on Feb. 9, 2012.

(51) Int. Cl.
*F16L 25/02* (2006.01)

(52) U.S. Cl.
CPC ............... *F16L 25/02* (2013.01); *F16L 25/026* (2013.01)

(58) Field of Classification Search
USPC .................................. 285/47, 368, 293.1, 423
See application file for complete search history.

(56) References Cited

U.S. PATENT DOCUMENTS

| | | | | |
|---|---|---|---|---|
| 1,574,690 A * | 2/1926 | Radabaugh | ...................... | 285/47 |
| 1,862,153 A * | 6/1932 | Lee | ................................ | 285/368 |
| 2,653,834 A * | 9/1953 | Purkhiser | ....................... | 285/363 |
| 3,018,119 A * | 1/1962 | Champion | .................. | 285/293.1 |
| 3,077,638 A | 2/1963 | Hickam | | |
| 3,782,419 A * | 1/1974 | Hanson | ............................ | 285/47 |
| 3,861,719 A * | 1/1975 | Hand | ................................ | 285/47 |
| 3,937,496 A * | 2/1976 | Zahid | .......................... | 285/293.1 |
| 4,595,218 A * | 6/1986 | Carr et al. | ....................... | 285/47 |
| 4,654,747 A * | 3/1987 | Covey | ............................ | 361/215 |
| 4,776,600 A | 10/1988 | Kohn | | |
| 5,078,431 A | 1/1992 | Hale | | |
| 5,340,161 A * | 8/1994 | Bagnulo | ........................ | 285/368 |
| 5,366,257 A * | 11/1994 | McPherson et al. | ............ | 285/423 |
| 5,447,340 A * | 9/1995 | Sands et al. | ...................... | 285/52 |
| 5,588,682 A | 12/1996 | Breese | | |
| 5,628,532 A | 5/1997 | Ashcraft | | |
| 5,678,866 A * | 10/1997 | Mina | ................................ | 285/47 |
| 5,973,903 A | 10/1999 | Tomerlin | | |
| 6,186,558 B1 * | 2/2001 | Komolrochanaporn | ....... | 285/423 |
| 6,286,875 B1 | 9/2001 | Snodgrass et al. | | |
| 6,979,028 B2 * | 12/2005 | Muroi et al. | ................... | 285/368 |
| 7,458,613 B2 * | 12/2008 | Spears | ......................... | 285/293.1 |
| 2006/0099843 A1 | 5/2006 | Fullner et al. | | |
| 2010/0187816 A1 | 7/2010 | Lum | | |

OTHER PUBLICATIONS

Illustration of Dielectric Junction Used in a Gas Propane Installation seen on Internet as of Feb. 6, 2013.

* cited by examiner

*Primary Examiner* — David E Bochna
(74) *Attorney, Agent, or Firm* — Fay Sharpe LLP

(57) ABSTRACT

The present disclosure pertains to a dielectric fitting for use in a fluid piping system to provide electrical insulation between metal components while fluid is transferred through a sealed connection. The dielectric fitting includes a metallic body including a distal end and a proximal end and a flange extending radially from the body and having a first end surface and an opposite second end surface. An electrical insulation over-mold adheres to the distal end of metallic body, the second end surface of the flange and at least a portion of the first end surface. The insulation over-mold is secured by a plurality of recesses or by an annular member positioned along the distal end. The over-mold includes an annular portion that extends axially away from the distal end of the metallic body.

18 Claims, 7 Drawing Sheets

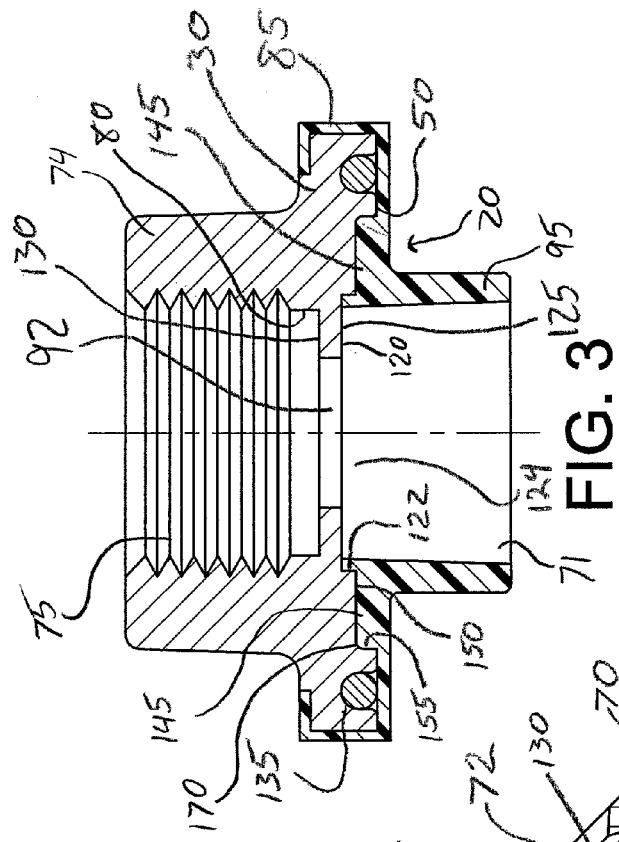
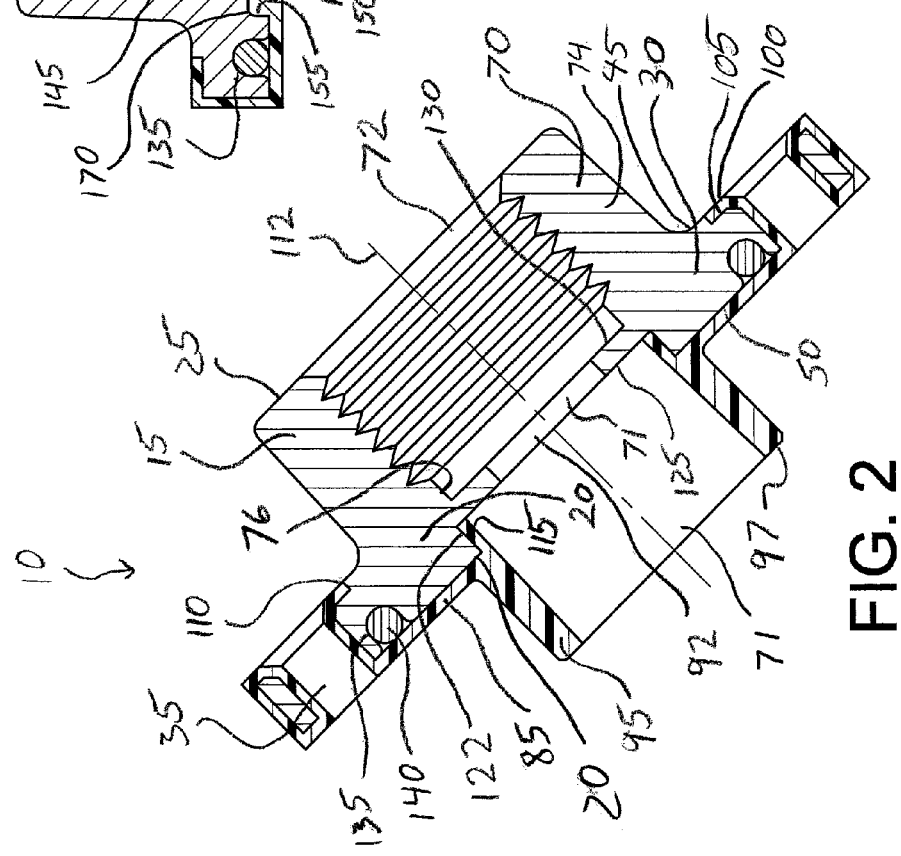

DIELECTRIC FITTING

This application claims priority from and claims the benefit of U.S. Provisional Application Ser. No. 61/596,763 which was filed on Feb. 9, 2012.

BACKGROUND

The present exemplary embodiment relates to gas line piping systems and more particularly to an electrically insulated system which includes a dielectric fitting as part of the system. It finds particular application in conjunction with a dielectric fitting for a fuel conduit system so that the conduits are electrically insulated at a joint for preventing or retarding the flow of electricity over the dielectric fitting, and will be described with particular reference thereto. However, it is to be appreciated that the present exemplary embodiment is also amenable to other like applications.

The connection between metal piping components such as pipes, conduits, unions or valves are prone to fluid or gas leaks due to the failure of a gasket or from corrosion caused by galvanic electric currents flowing across the connection. Further, corrosion is known to occur where the connection includes contact between two different types of metals while being exposed to an acidic solution. This combination effectively forms a battery which causes an electrical current to flow between the two metals such that molecules from one of the metals is deposited on the other, thereby resulting in galvanic electrolysis. To solve this problem, it is known in the art to use an electrically insulating member at the connection between the dissimilar metals to reduce or prevent electric current from flowing across the connection.

The 2011 edition of the National Fire Protection Association (NFPA) Code, Section 58, titled: Liquefied Petroleum Gas Code, requires a dielectric fitting at a building to electrically isolate the piping leading from a fuel tank from the piping in the building. Code section 6.9.3.16 states that underground metallic piping, tubing, or both that convey liquid petroleum (LP) gas from a gas storage container shall be provided with dielectric fittings at the building to electrically isolate it from the aboveground portion of the fixed piping system that enters a building. Such dielectric fittings are installed aboveground and outdoors. Compliance with this regulation is currently accomplished by installing a separate dielectric union at an inlet of a second stage regulator of a multi-stage regulator system. Notably, a multi-stage regulator system includes a first stage regulator to reduce gas pressure from a storage tank as it enters the gas lines and a second stage regulator to further decrease the pressure of the gas to a usable level for appliance demand. Second stage regulators are positioned by or in a building and work with the lower pressures delivered by first stage regulators to lower the pressure even more so that the LP gas will safely and adequately supply the demand of the appliances in the building or structure.

There are some types of dielectric fittings currently available. However, many of these fittings have insulation that is not optimally positioned between the metals due to the geometric orientation of the insulation. The insulation may be prone to shifting relative to the metal pipe joint, causing the pipes to contact each other thereby risking galvanic reaction. Further, the addition of a dielectric union to the second stage regulator in compliance with NFPA 58 adds cost to the overall system including the price for the additional materials as well as labor costs for installation. These additional connection points or joints also increase the risk of leakage in the system.

Therefore, there remains a need for minimizing the cost of labor and materials while maintaining compliance with NFPA code and reducing the risk of leaks within a fluid piping system.

BRIEF DESCRIPTION

In one embodiment, a dielectric fitting is provided for use in a fluid conduit system to provide electrical insulation between metal components while a fluid, such as a gas or a liquid, flows therethrough. The dielectric fitting defines a fluid passage with an inlet and an outlet to communicate between a pair of axially spaced associated metal components of the conduit system and provides electrical insulation between the associated metal components. The dielectric fitting comprises a metallic body including a distal end and a proximal end wherein the metallic body includes a base member and a flange that protrudes radially from the base member. The base member is configured to connect to a first associated metal component at the proximal end and the flange is configured to connect to a second associated metal component at the distal end.

An electrical insulation over-mold is adhered to the distal end of the metallic body and at least a portion of the flange. The insulation over-mold includes an annular portion which defines the inlet of the dielectric fitting and extends axially away from the distal end of the metallic body. The electrical insulation over-mold electrically separates the metallic body from the second associated metal component.

In one embodiment, the distal end surface includes a plurality of recesses wherein at least a portion of the over-mold is received within the recesses. The plurality of recesses can include a base wall, an end wall and a first and a second side wall.

In another embodiment, an annular member is provided in lieu of the plurality of recesses and defines an opening in communication with the outlet. The cylindrical annular member extends axially outwardly from the second end surface of the flange and includes an annular wall that extends from an edge of the cylindrical annular member to a radial shoulder that defines the outlet of the metallic body. The cylindrical annular member is covered by the insulation over-mold.

BRIEF DESCRIPTION OF THE DRAWINGS

The present disclosure may take form in certain parts and arrangements of parts, an embodiment of which will be described in detail in this specification and illustrated in the accompanying drawings which form a part hereof and wherein:

FIG. 2 is a reduced cross-sectional view of the dielectric fitting along line 2-2 of FIG. 1;

FIG. 3 is a reduced cross-sectional view of the dielectric fitting along line 3-3 of FIG. 1;

DETAILED DESCRIPTION

It is to be understood that the detailed figures are for purposes of illustrating exemplary embodiments only and are not intended to be limiting. Additionally, it will be appreciated that the drawings are not to scale and that portions of certain elements may be exaggerated for the purpose of clarity and ease of illustration.

In accordance with the present disclosure, a dielectric fitting is provided for use in a joint between a fluid line and a fluid valve for electrical insulation of the fluid lines from each other. In one embodiment, the fluid is a gas such as a liquid petroleum (LP) gas. The dielectric fitting is configured to be easily installed and sufficient to prevent leaks between the pipe ends while at the same time serving to reduce, and perhaps eliminate, the risk of joint failure due to galvanic electrolysis.

Figure 1:
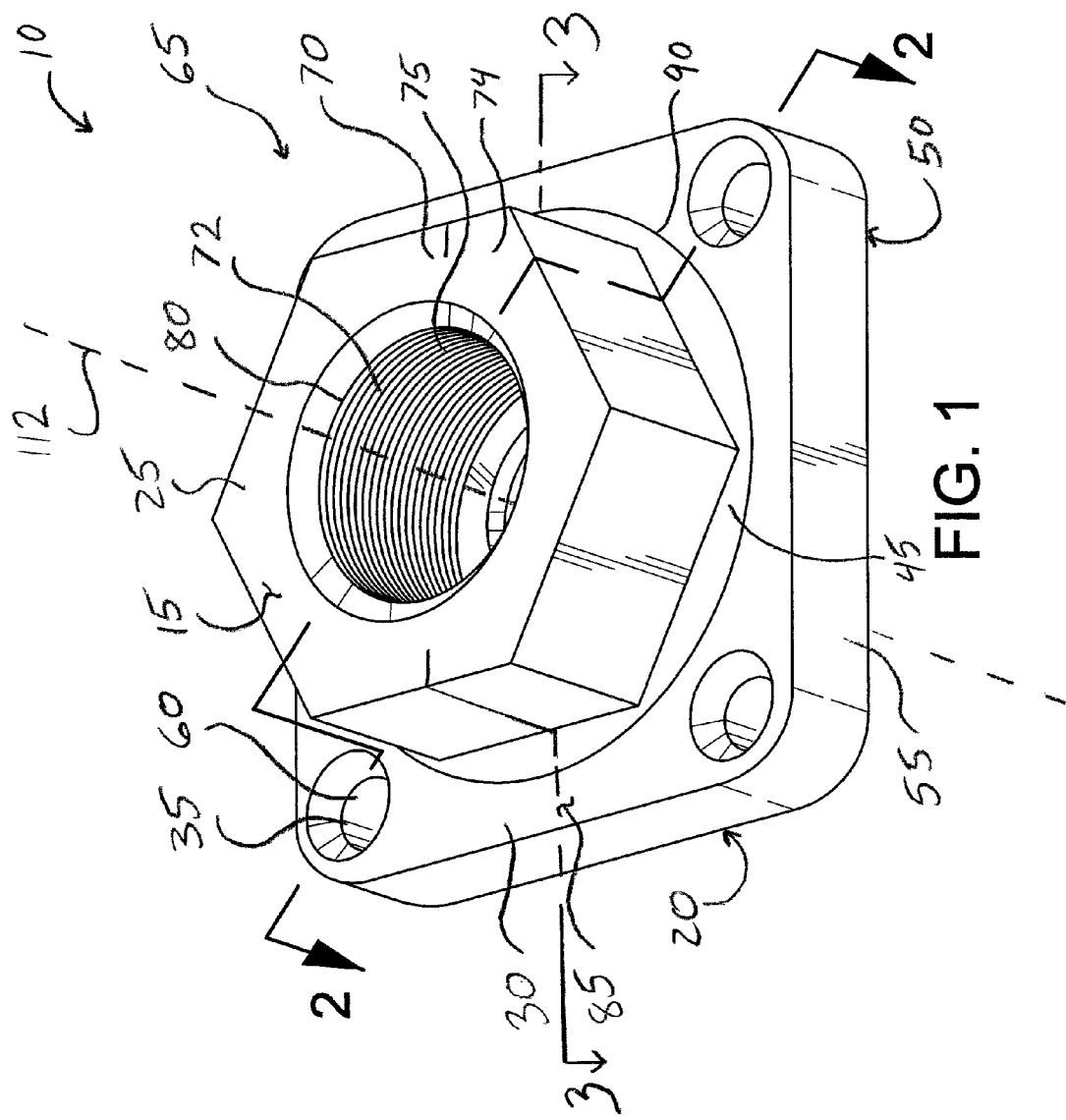
FIG. 1 is a perspective view of a top portion of a dielectric fitting according to the present disclosure.
Figure 6:
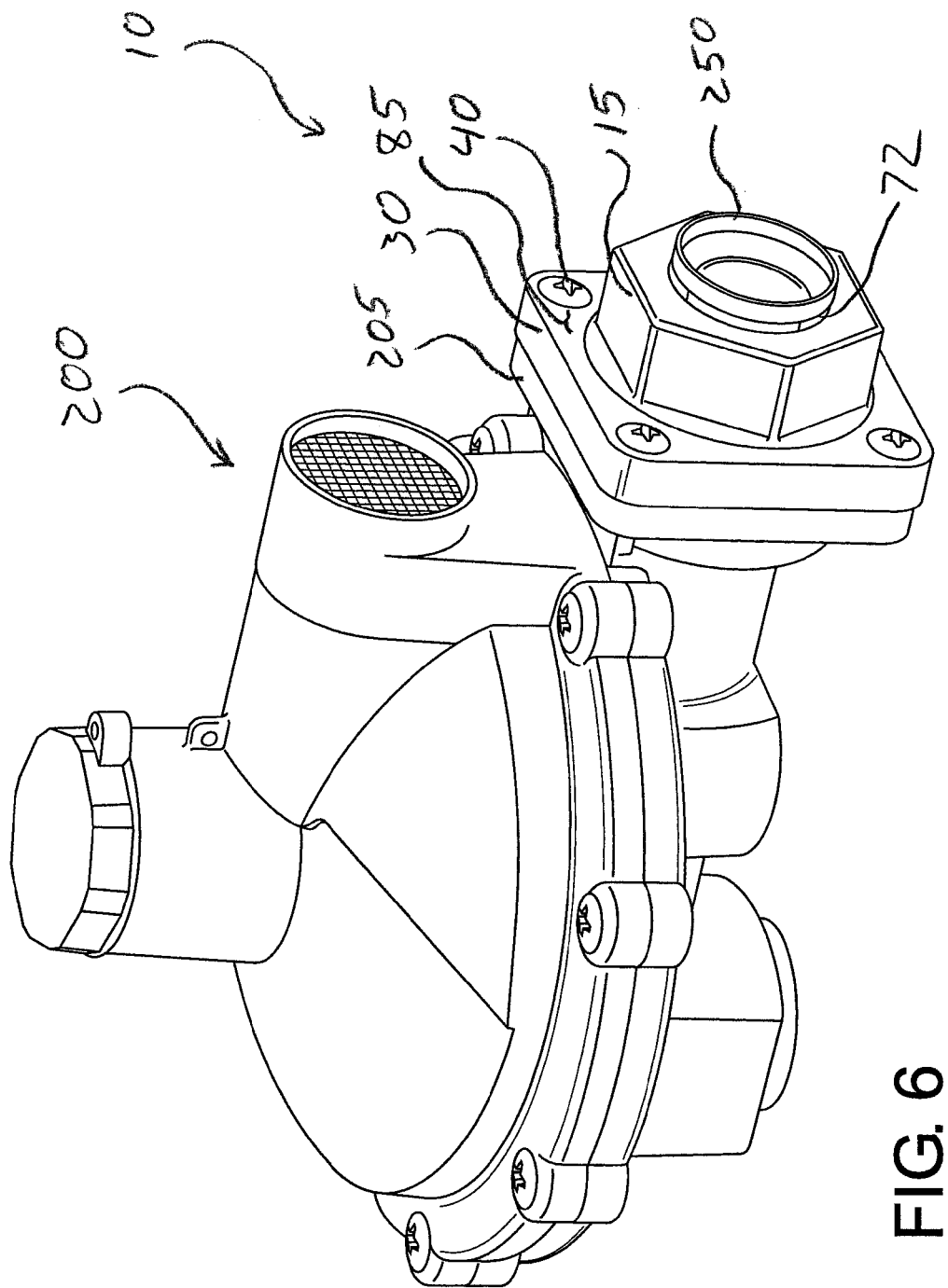
FIG. 6 is a reduced perspective view of the valve assembly of FIG. 5.

With reference to FIG. 1, one embodiment of a dielectric fitting 10 is provided for use in LP gas line systems. However, it should be appreciated that the dielectric fitting is not limited for use merely in LP gas lines as it could also be used in various other gas or liquid line systems. The dielectric fitting 10 includes a metallic body 15 having a distal end 20 having an inlet 71 and a proximal end 25 defining an outlet 72. The metallic body 15 has a base member 70 and a metallic flange 30 that extends radially outwardly from the base member 70. The inlet and outlet 71 and 72 are in fluid communication along a central axis 112 of the dielectric fitting 10. The flange 30 includes a plurality of fastener apertures 35 that are configured to receive a plurality of conventional fasteners 40 therein (FIG. 6). In one embodiment, there are four fastener apertures 35 and four fasteners 40. With reference now to FIG. 2, the flange 30 includes a first end surface 45 that is spaced from a second end surface 50 by a peripheral side wall 55 extending therebetween. In one embodiment, the flange 30 has a generally square configuration with rounded edges. However, the shape of the flange 30 can be different and can include various other geometrical shapes such as a polygon, rectangle or circle. It is not limited to a square configuration. As shown in FIG. 1, the fastener apertures 35 include a continuous inner surface 60 that extends between the first end surface 45 and second end surface 50 of the flange 30.

FIG. 1 illustrates a top portion 65 of the dielectric fitting 10 wherein the base member 70 of the metallic member 15 includes a generally hexagonal nut 74 and a threaded bore 75 extends from the outlet 72 towards a shoulder 76. However, the base member 70 may include other fluid line attachment configurations and body shapes and is not limited to a conventional hexagonal nut shape with threads therein. The outlet 72 is configured to receive a metal component such as a pipe or conduit from a fluid line system to facilitate the transfer of fluid through the inlet 71 of the fitting 10. As noted, the metallic member 15 can have any desired shape, the perimeter of which can be either circular or non-circular.

A non-conducting layer or electrically insulated over-mold 85 is attached to a substantial portion of the distal end 20 of the metallic member 15 and about the flange 30. The over-mold 85 is made of an electrical insulation type material such as a conventional rubber or plastic composition and is configured to interrupt a flow of electrical current between the metallic member 15 and an associated piping component such as a valve or pipe attached to the dielectric fitting 10. The insulation over-mold 85 covers the flange 30 including a portion of the first end surface 45, the second end surface 50 and the peripheral side wall 55 located therebetween. The insulating over-mold 85 also covers the inner surface 60 of the fastener apertures 35, as is evident from FIG. 2. In one embodiment, the insulation over-mold 85 substantially covers the flange 30 and abuts an annular shoulder 110 of the body 15. The over-mold 85 covers the first end surface 45 of the flange 30 up to a limit line 90 that circumscribes the base member 70 of the dielectric fitting 10. The limit line 90 can include any configuration about the first end surface 45 of the flange 30 and can optionally extend up and even cover a portion of the base member 70. Additionally, the insulation over-mold 85 is configured to cover the flange 30 and the inner surface 60 such that the metallic member 15 remains electrically insulated from the fasteners 40 as they are inserted into the fastener apertures 35. (FIG. 6) The fasteners 35 are used to connect the distal end 20 of the dielectric fitting 10 to a second metal component.

FIG. 2 illustrates a cross-sectional portion of the dielectric fitting 10 of FIG. 1 along planar line 2-2. FIG. 2 illustrates one embodiment of the dielectric fitting 10 having the metallic member 15 covered by the over-mold 85 in a generally recessed orientation. In this embodiment, the over-mold 85 is adhered to the flange 30 such that an outer surface 100 of the over-mold 85 substantially aligns with the first end surface 45 of the flange 30 of metallic member 15 about the continuous annular shoulder 110. However, the dielectric fitting 10 can optionally be configured in a non-recessed orientation such that the inner surface 105 of the over-mold 85 is adhered to the first end surface 45 of the metallic member 15 without annular shoulder 110. Notably, the second end surface 50 of the flange 30 is generally aligned with the distal end 20 of the metallic body 15.

The electrical insulated over-mold layer 85 includes a cylindrical annular portion or skirt 95 that extends away from the distal end 20 of the metallic body 15 and is oriented generally transverse to the second end surface 50 of the flange 30. The annular portion 95 includes a distal edge 97 that is configured to define the inlet 71. The outlet 72 and the inlet 71 are generally aligned along a central axis 112 such that the cylindrical annular portion 95 extends in an orientation generally transverse to the flange 30. In one embodiment, the inlet 71 has a smaller diameter than the outlet 72, as illustrated in FIG. 2.

The cylindrical annular portion 95 also includes an axial lip 115 that extends in a direction opposite to the distal edge 97 and inwardly from the distal end 20 of the metallic body 15 and second end surface 50 of the flange 30. The axial lip 115 abuts the surface of an interior annular flange 120 (FIG. 3) and is adhered to an annular wall 122 defined on the metallic body 15. The annular wall 122 extends axially inward from the distal end 20 and at least partially defines an inner through bore 124 between the distal end 20 and the proximal end 25. The annular wall 122 extends from the distal end 20 and abuts the interior annular flange 120. The annular flange 120 extends radially inwardly from an inner surface 80 of the outlet 72 and defines a passage 92 between the inlet 71 and the outlet 72 of the dielectric fitting 10.

The annular flange 120 includes an abutment surface 125 that is configured to abut the axial lip 115 of the over-mold 85. The abutment surface 125 is located opposite a rest surface 130 defined on the annular flange 120. The rest surface 130 is configured to restrict axial movement of a component such as a pipe or conduit that is connected to the fitting 10 via the threads 75. Once inserted within the outlet 72, the conduit is limited in its axial movement when it comes into contact with the rest surface 130 of the annular flange 120.

Figure 4:
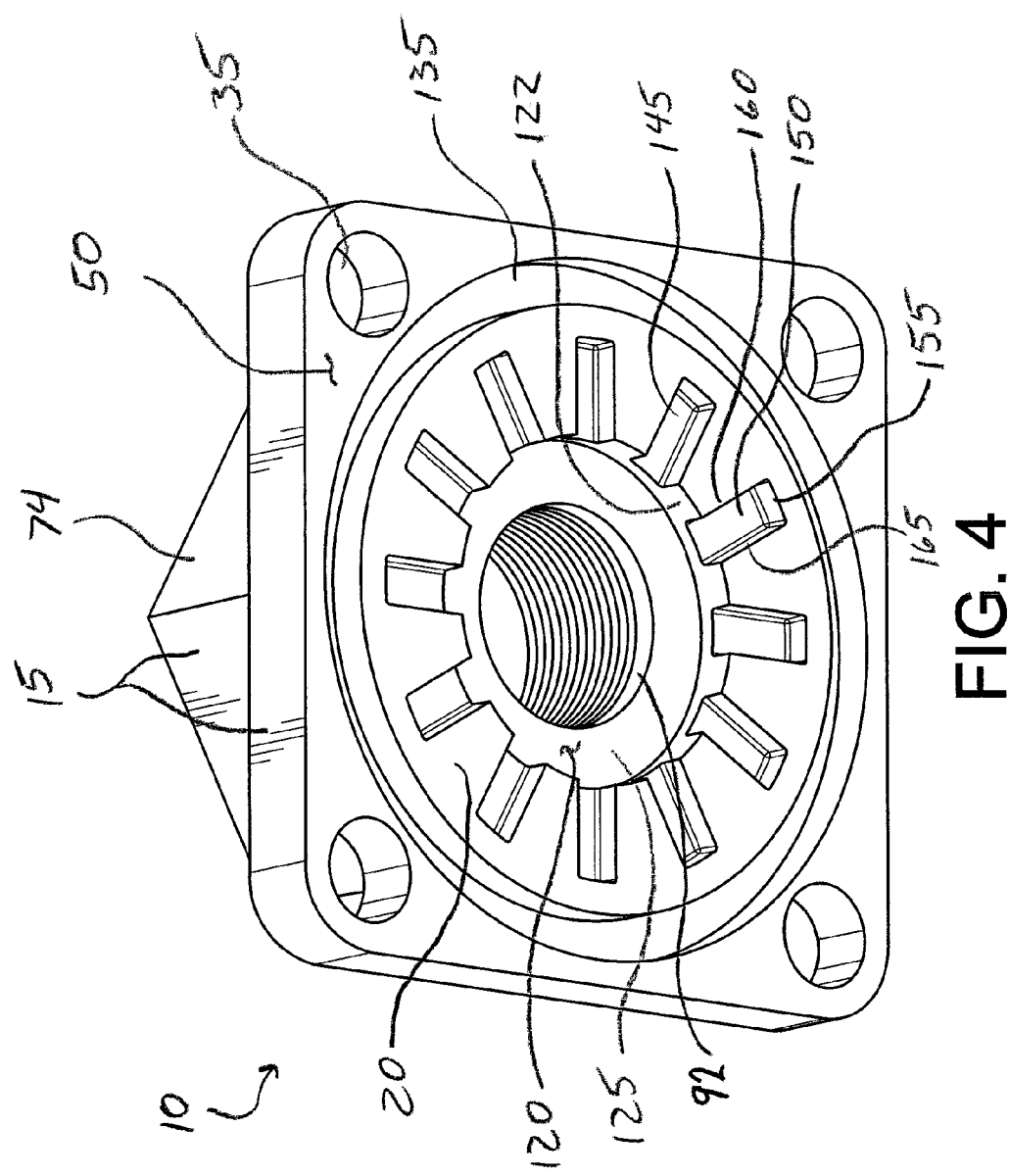
FIG. 4 is a perspective view of a bottom face of a metal portion of the dielectric fitting according to the present disclosure.

An annular groove 135 is defined in the metallic body 15 and can be recessed into the second end surface 50 of the flange 30 or the distal end 20. The groove 135 accommodates an elastomeric gasket 140 such that the over-mold 85 extends over the annular groove 135 and gasket 140 located therein. The annular groove 135 generally circumscribes the inlet 71. The annular groove 135 can be located radially inwardly of the plurality of fastener apertures 35. In one embodiment, as illustrated by FIGS. 3 and 4, the groove 135 is spaced radially outwardly from a plurality of recesses, grooves or channels 145 defined in the second end surface 50. The recesses 145 are spaced from one another and extend radially outwardly from the annular wall 122. FIG. 4 illustrates the distal end 20 of the metallic member 15 without the over-mold 85. Noticeably, at the recesses 145, the annular wall 122 has a reduced height. Each of the recesses 145 includes a base wall 150, an end wall 155, and first and second side walls 160, 165. In this embodiment, the recesses 145 have a generally rectangular shape. However, the size and shape of the each recess could vary from one to the other and the recesses could have other geometric shapes both linear and non-linear. For ease of manufacture, it may be desirable to have recesses that are identical in shape. Further, for better adhesion of the electrical over-mold material, it may be desirable to provide a large number of such recesses. This configuration prevents unwanted rotational or axial movement of the over-mold material relative to the metallic material of the dielectric fitting 10.

FIG. 3 illustrates a cross-sectional portion of the dielectric fitting 10 of FIG. 1 along planar line 3-3. In FIG. 3, the recesses 145 are positioned along the second end surface 50 of the flange 30 and extend radially outwardly from the annular wall 122. In one embodiment, the end wall 155 and sidewalls 160, 165 extend from the base wall 150 at a rounded edge 170.

The plurality of recesses 145 receive the dielectric material of the over-mold 85 and enhance the strength of adherence between the metallic body 15 and the over-mold 85 due to the provision of additional surface area for adhesion of the over-mold material to the metallic member. The recesses 145 increase the amount of surface area between the over-mold 85 and the second end surface 50 such that adhesion strength between the over-mold 85 and the metallic body 15 is increased. Additionally, the recesses 145 and the annular wall 122 provide structural rigidity to the over-mold 85 and aid it against unintended deformation caused by natural forces such as vibration, compression, or internal pressure shock. The over-mold 85 is restricted from movement radially outward relative to the center axis 112 due to the presence of the annular wall 122, the end walls 155 and the fastener apertures 35. Further, the over-mold 85 is restricted from rotational movement as portions of the over-mold 85 abut the sidewalls 160, 165 within the recesses 145 thereby restricting rotation. Portions of the over-mold 85 that are wrapped within the fastening apertures 35, the first end surface 45 and the peripheral side 55 of the flange 30 further assist with preventing unintended movement of the over-mold relative to the metallic body 15.

The layer of dielectric material of the over-mold 85 adheres to the first end surface 45 up to the annular edge 110. The over-mold 85 abuts the annular edge 110 along limit line 90.

Figure 5:
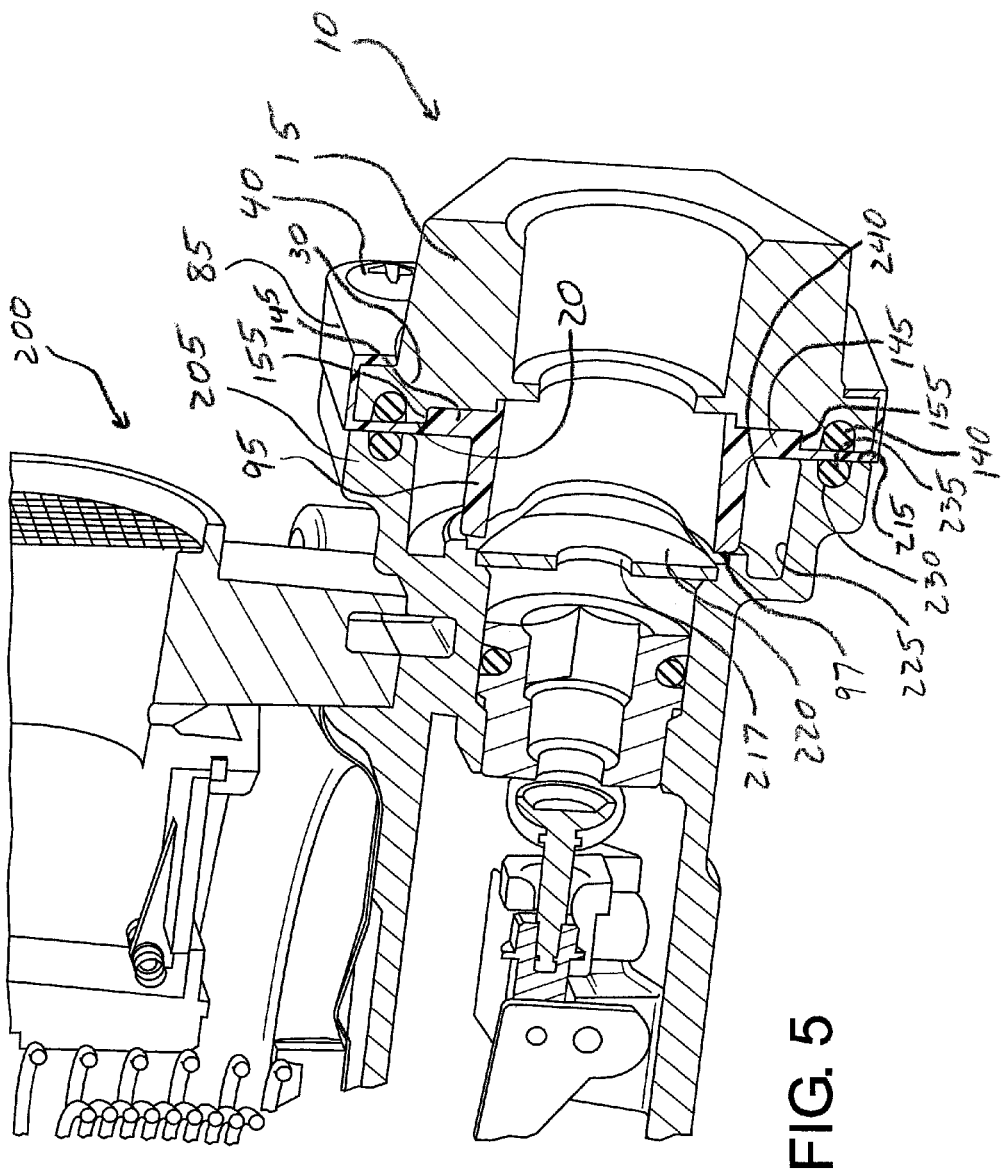
FIG. 5 is a cross-sectional perspective view of the dielectric fitting of FIG. 1 as connected to a gas valve according to the present disclosure.

FIGS. 5 and 6 disclose the dielectric fitting 10 as it is attached to a second metal component such as a valve 200 or more particularly, a second stage LP pressure reduction valve. It should be appreciated that the dielectric fitting 10 is not limited for use with pressure reduction valves and can be connected with any other fluid or gas line system components or as a union between pipes having a flange type fitting. In this embodiment, the cylindrical annular portion 95 of the over-mold 85 extends within a bulkhead 205 of the valve 200. The bulkhead 205 includes a front bulkhead end face 215 which is configured to be attached directly to a pipe or conduit as is known in the art. The bulkhead 205 includes an opening 210 defined in the bulkhead end face 215 that is operative to receive the cylindrical annular portion 95 of the dielectric fitting 10 therein such that the second end surface 50 of the flange 30 and the over-mold 85 attached thereto abut the bulkhead end face 215.

A valve opening 217 is axially spaced from the bulkhead end face 215 and is in communication with the inlet 71 defined the distal edge 97 of the annular portion 95. The valve opening 217 is defined in a valve ledge 220 located within the bulkhead 205 and is configured to abut the distal edge 97 of the annular portion 95. Additionally, an internal surface 225 extends between the valve ledge 220 and a bulkhead surface 215.

Recessed into the bulkhead end face 215 is a groove 230 which accommodates a valve gasket 235 such as an O-ring. FIG. 5 illustrates that the annular groove 135 and gasket 140 positioned under the over-mold 85 on the flange 30 can be installed in general alignment with groove 230 and valve gasket 235 on the bulkhead end face 215. Thus the two O-rings 140 and 235 abut each other with the layer of dielectric over-mold 85 trapped between them. The reason for employing O-rings 140 and 235 despite the presence of the layer of dielectric material is that the dielectric material could have porosity, as could the metal of the fitting 10 and the valve 200. The elastomeric material of the two O-rings 140 and 235 will cooperate to provide a leak-resistant seal. In this embodiment, conventional fasteners 40 are inserted through the fastener apertures 35 and corresponding holes within the bulkhead 205 thereby securing the dielectric fitting 10 to the valve 200.

In one embodiment, the distal edge 97 of the annular portion 95 abuts the valve ledge 220 such that the annular portion 95 can be somewhat flexed or compressed between the distal end 20 of the metallic body 15 and the valve ledge 220 within the bulkhead 205. Additionally, the over-mold 85 is secured in place between the bulkhead 205 and the metallic member 15. The over-mold 85 insulates the connection and prevents direct contact between the valve 200 and the metallic member 15 of the dielectric fitting 10. In this configuration, a toroidal cavity 240 is formed between the internal surface 225 of the bulkhead 205 and exterior of the annular portion 95. This toroidal cavity 240 may have any desired dimension and configuration.

As the dielectric fitting 10 is installed, the dielectric material of the over-mold 85 can be somewhat compressed between the second end surface 50 of the flange 30 and the bulkhead end face 215. In one embodiment, the recesses 145 on the distal end 20 of the metallic body 15 are aligned with the toroidal cavity 240 within the bulkhead 205. Noticeably, the end walls 155 of the recesses 145 are generally aligned with the internal surface 225 or located radially inwards from the bulkhead surface 215. This configuration allows for a sealed and electrically insulated connection between the metallic member 15 and the valve 200 and dissimilar metal types are prevented from surface contact.

FIG. 6 illustrates the dielectric fitting 10 attached to valve 200 along the second end surface 50 with the dielectric layer of the over-mold 85 thereon. A first metal component such as a metal conduit 250 extends away from the outlet 72 in the base member 70 of the metallic member 15. It is noted that the fasteners 40 are in contact with the bulkhead 205 of the valve 200, but remain electrically insulated from contact with the flange 30 of the metallic body 15 because the dielectric material of the over-mold 85 sufficiently separates the fasteners 40 from the metallic body 15 and hence the conduit 250. The metal conduit 250 is in contact with the metallic body 15 of the dielectric fitting 10 and is insulated from contact with the bulkhead 205 of the valve 200 such that galvanic electrolysis is prevented.

Figure 8:
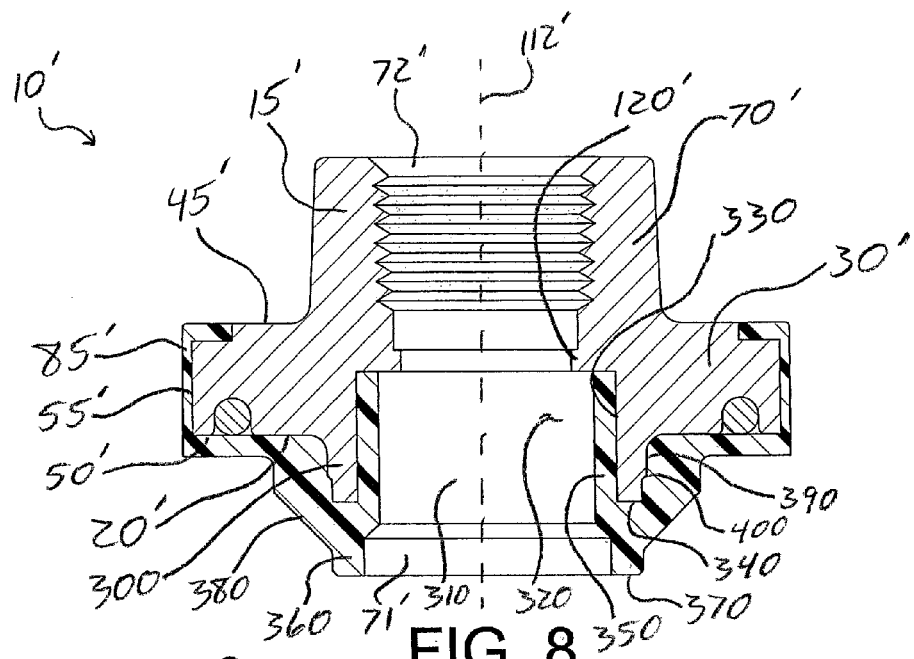
FIG. 8 is a reduced cross-sectional view of the dielectric fitting along line 8-8 of FIG. 7.
Figure 7:
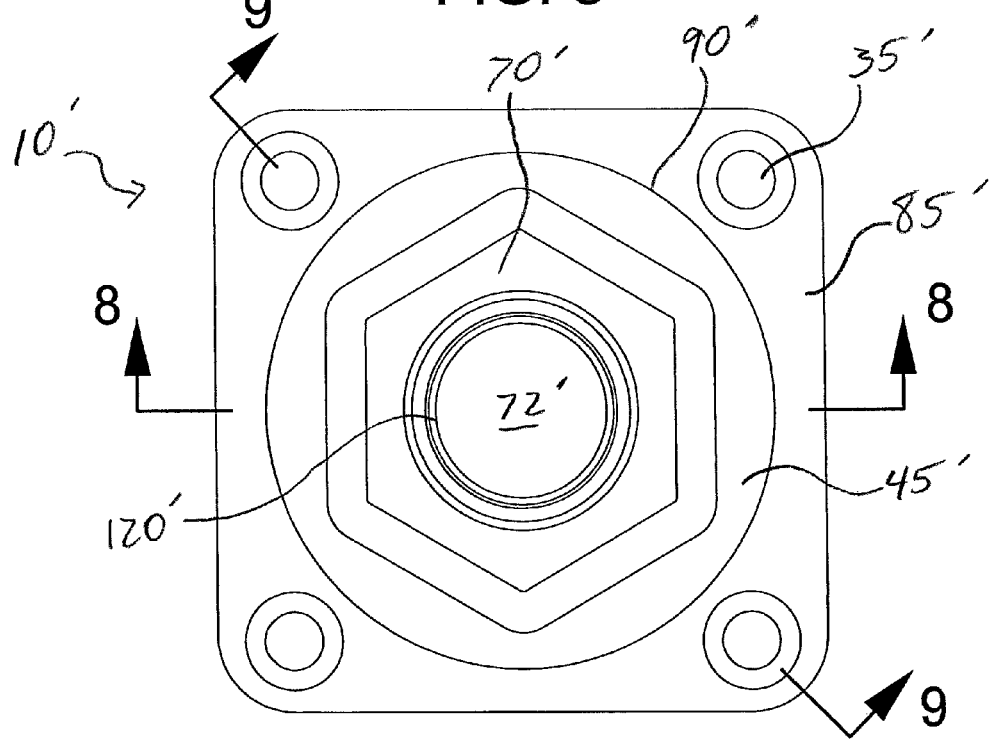
FIG. 7 is a bottom view of one embodiment of the dielectric fitting according to the present disclosure.

FIGS. 7-10 illustrate a second embodiment of the dielectric fitting in which like components are identified by like numerals with a primed (') suffix and new components are identified by new numerals. FIG. 7 shows a top view of a dielectric fitting 10' including a metallic body 15' and a flange 30' extending radially therefrom. An electrical insulation over-mold 85' is adhered to the dielectric fitting 10'. FIG. 8 depicts a cross section of the dielectric fitting 10' of FIG. 7 along line 8-8. The dielectric fitting 10' can optionally include an annular member 300 that protrudes from a distal end 20' of the metallic body 15'. A first edge 340 of the annular member 300 defines an opening 310 aligned with an inlet 71' defined by the annular portion of the over-mold 85'. The insulation over-mold 85' is adhered to a distal end 20' of the metallic body 15' as well as the annular member 300. In this embodiment, the metallic body 15' includes a central bore 320 that is defined by an inner surface 330 of the annular member 300. The inner surface 330 extends from the first edge 340 of the annular member 300 to an annular flange 120' located axially inwardly from the distal end 20'. The insulation over-mold 85' includes an annular sleeve 350 that adheres to the inner surface 330 and extends inwardly from the first edge 340 to abut an annular flange 120' that extends radially inward from the inner surface 330.

The annular member 300 is generally aligned with an annular portion 360 of the insulation over-mold 85' as the annular portion 360 covers the annular member 300. Similarly, the first edge 340 of the annular member 300 is radially aligned with a distal edge 370 of the annular portion 360. In this embodiment, the annular portion 360 of the insulation over-mold 85' includes a radial taper 380 shaped profile that generally circumscribes the annular member 300. The annular member 300 includes an outer surface 390 that includes a profile with a radial ridge 400 that circumscribes the annular member 300 and is generally aligned with the radial taper 380. The radial taper 380 is configured to be received by the second metal component of the conduit system such as within the bulkhead of the valve shown in FIG. 5.

Figure 9:
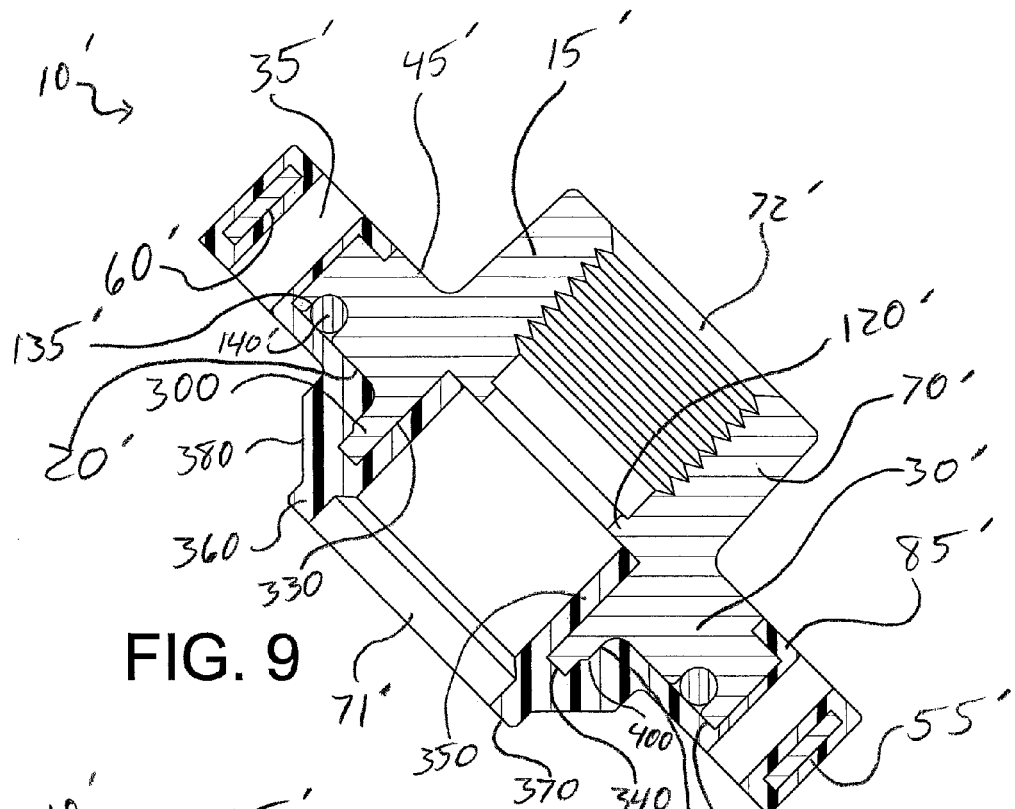
FIG. 9 is a reduced cross-sectional view of the dielectric fitting along line 9-9 of FIG. 7.
Figure 10:
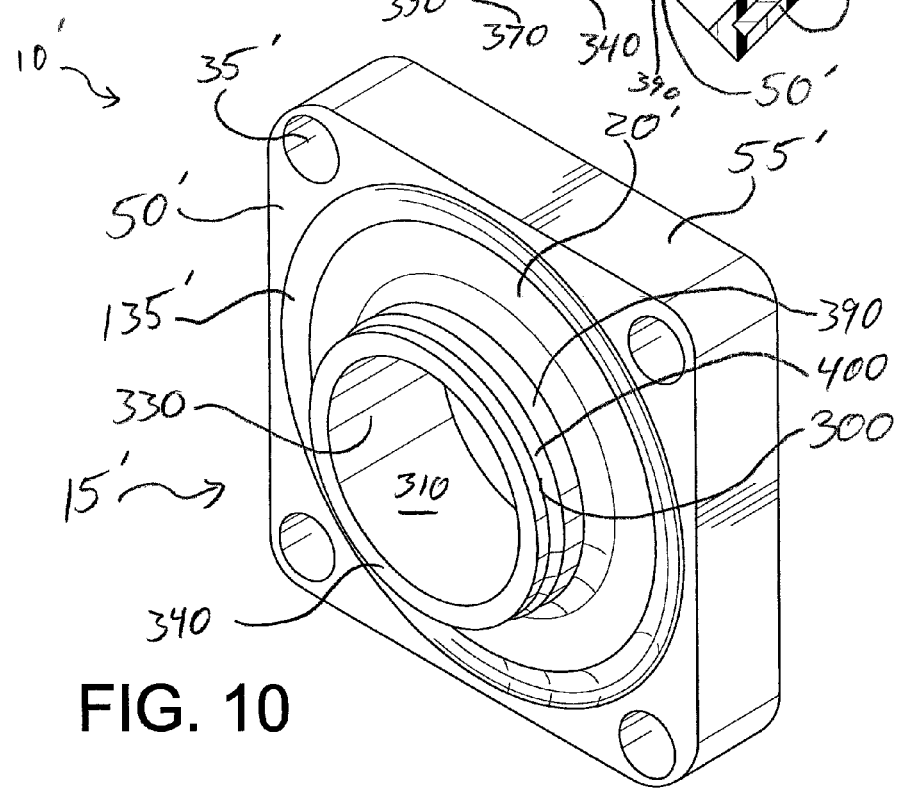
FIG. 10 is a perspective view of a bottom face of a metal portion of the dielectric fitting of FIG. 7 according to the present disclosure.

FIG. 9 illustrates a cross section of the dielectric fitting 10' of FIG. 7 along line 9-9 in which the over-mold 85' is also adhered to an inner surface 60' of a plurality of fastener apertures 35'. FIG. 10 shows the distal end 20' of the metallic body 15' without the insulation over-mold 85' attached thereto. In this embodiment, the annular member 300 supports the dielectric material of the over-mold 85' and enhances the strength of adherence between the metallic member 15' and the over-mold 85' due to the provision of additional surface area for adhesion of the over-mold material to the metallic body 15'. The annular member 300 increases the amount of surface area between the over-mold 85' and the distal end 20' such that adhesion strength between the over-mold 85' and the metallic body 15' is increased. Additionally, the annular member 300 and the inner surface 330 provide structural rigidity to the over-mold 85' and aid it against unintended deformation caused by natural forces such as vibration, compression, or internal pressure shock. The over-mold 85' is restricted from movement radially outward relative to a center axis 112' due to the presence of the annular member 300, the inner surface 330 and the fastener apertures 35'. Further, the over-mold 85' is restricted from rotational movement. Portions of the over-mold 85' that are wrapped within the fastening apertures 35', a first end surface 45' and a peripheral side 55' of the flange 30' further assist with preventing unintended movement of the over-mold relative to the metallic body 15'.

The dielectric fitting 10, 10' can be used in a method of providing dielectric protection between a pair of axially spaced metal components of a conduit system such as between the metal pipe 250 and the valve 200 illustrated in FIG. 6, for example, in a LP plumbing system. With reference now to the embodiment of FIGS. 1-4, the dielectric fitting 10 includes the metallic body 15 comprising the base member 70 and the flange 30 that extends radially from the base member 70. The inlet 71 is located adjacent the distal end 20 of the metallic body 15 and is in communication with the outlet 72 located on the proximal end 25 of the metallic body 15. The electrical insulation over-mold 85 is secured to at least a portion of the distal end 20 wherein an annular portion 95 of the insulation over-mold defines the inlet 71 and extends axially away from the distal end 20. The first metal component such as the pipe 250 is threadingly attached to the proximal end 25 of the dielectric fitting 10 and the second metal component such as the valve 200 is attached to the distal end 20 of the dielectric fitting 10 such that the annular portion 95 of the insulation over-mold 85 is received by the second metal component 200.

In the first embodiment, the insulation over-mold 85 is secured to the dielectric fitting 10 by receiving at least a portion of the insulation over-mold 85 within a plurality of spaced recesses 145 positioned along the distal end 20 of the metallic body 15. In the second embodiment, the electrical insulation over-mold 85' is secured to the dielectric fitting 10' by extending the annular member 300 axially away from the distal end 20' of the metallic body 15' and covering the annular member 300 with the annular portion 95' of the electrical insulation over-mold 85' such that the annular member 300 and the annular portion 95' of the electrical insulation over-mold 85' are configured to be received within the second metal component.

The exemplary embodiments of the disclosure have been described herein. Obviously, modifications and alterations will occur to others upon reading and understanding the preceding detailed description. It is intended that the instant disclosure be construed as including all such modifications and alterations insofar as they come within the scope of the appended claims or the equivalents thereof.

The invention claimed is:

1. A dielectric fitting that defines a fluid passage to communicate between a pair of axially spaced associated metal components of a conduit system and provides electrical insulation between the associated metal components, the fitting including an inlet and an outlet, the dielectric fitting comprising:

a metallic body including a distal end and a proximal end wherein the metallic body includes a base member, a flange that protrudes radially outwardly from the base member and wherein the fluid passage extends from the distal end to the proximal end of the metallic body, the base member being configured to connect to a first associated metal component at the proximal end and the flange being configured to connect to a second associated metal component at the distal end;

an electrical insulation over-mold adhered to the distal end of the metallic body and at least a portion of the flange, the insulation over-mold including an annular portion which defines the inlet of the dielectric fitting and extends axially away from the distal end of the metallic body, wherein the electrical insulation over-mold electrically separates the metallic body from the second associated metal component; and wherein the flange of the metallic body further comprises an annular groove which circumscribes the inlet and is configured to accommodate a gasket or an O-ring which faces the second associated metal component and wherein the over-mold extends over the annular groove.

2. The dielectric fitting in accordance with claim 1 further comprising a plurality of spaced recesses located at the distal end of the metallic body such that the insulation over-mold is at least partially received within the recesses.

3. The dielectric fitting in accordance with claim 2 wherein each recess includes a base wall, an end wall and a first and a second side wall.

4. The dielectric fitting in accordance with claim 2 further comprising an annular wall which extends axially inward at the distal end of the metallic body into the fluid passage.

5. The dielectric fitting in accordance with claim 4 wherein the annular wall abuts an annular flange within the passage of the dielectric fitting such that the insulation over-mold abuts against the annular wall and the annular flange.

6. The dielectric fitting in accordance with claim 1 further comprising an annular flange that extends radially inwardly from an annular wall defining the fluid passage of the metallic body such that the insulation over-mold includes an annular lip that extends axially inwardly from the distal end and abuts the annular flange.

7. The dielectric fitting in accordance with claim 1 wherein the metallic body further comprises an annular member that protrudes axially outwardly from the distal end and defines an opening wherein the insulation over-mold covers the annular member.

8. The dielectric fitting in accordance with claim 7 wherein the fluid passage is defined by an inner surface of the annular member, and wherein the insulation over-mold includes an annular sleeve that adheres to the inner surface and extends axially inwardly from the distal end to abut an annular flange that extends radially inwardly from the inner surface.

9. The dielectric fitting in accordance with claim 1 wherein the flange includes a first end surface, an opposite second end surface and a peripheral side wall that extends between the first end surface and second end surface, wherein the insulation over-mold covers the second end surface, the peripheral side wall and at least a portion of the first end surface of the flange.

10. The dielectric fitting in accordance with claim 1 wherein the flange includes at least one fastener aperture configured to receive an associated conventional fastener, the at least one fastener aperture including an inner surface that extends between a first end surface and a second end surface of the flange.

11. The dielectric fitting in accordance with claim 10 wherein the insulation over-mold covers the inner surface of the at least one fastener aperture of the flange.

12. A dielectric fitting defining a passage including an inlet and an outlet, the fitting comprising:
a metallic body including a base member and a flange which extends radially outwardly from the base member wherein a central bore extends from a distal end of the metallic body to a proximal end thereof such that the metallic body is configured for connection with a first associated metal component at the proximal end and is configured for connection with a second associated metal component at the distal end, wherein the flange includes a first end surface and an oppositely disposed second end surface such that the second end surface of the flange is generally aligned with the distal end of the metallic body;

an electrical insulation over-mold adhered to the distal end of the metallic body, the second end surface of the flange and at least a portion of the first end surface of the flange wherein the insulation over-mold includes an annular portion that defines the inlet of the dielectric fitting and extends axially away from the distal end of the metallic body;

wherein the metallic body further comprises an annular member which extends axially outwardly from the distal end of the metallic body and defines an opening in communication with the inlet and wherein the annular portion of the insulation over-mold is adhered to both an outer and an inner face of the annular member; and, wherein the flange includes at least one fastener aperture configured to receive an associated conventional fastener, the at least one fastener aperture including an inner surface that extends between the first end surface and the second end surface of the flange such that insulation over-mold adheres to the inner surface of the at least one fastener aperture of the flange.

13. The dielectric fitting according to claim 12 wherein the annular portion of the insulation over-mold includes a radial taper shaped profile.

14. The dielectric fitting according to claim 12 further comprising an annular groove defined axially inwardly from the distal end wherein the groove circumscribes the annular member and is configured to accommodate a gasket.

15. The dielectric fitting according to claim 12 further comprising an annular flange which extends radially inwardly from an annular wall of the central bore and wherein the insulation over-mold includes an annular lip that extends axially inwardly from the distal end and abuts the annular flange.

16. A method of providing dielectric protection between a pair of axially spaced metal components of a conduit system comprising:
providing a dielectric fitting having a metallic body including a base member and a flange that protrudes radially outwardly from the base member, the metallic body including an inlet located adjacent a distal end of the metallic body and an outlet located adjacent an opposite proximal end of the metallic body, the outlet being in communication with the inlet;
providing a groove in the flange encircling the outlet and locating a gasket or an O-ring in the groove;
securing an electrical insulation over-mold to at least a portion of the flange wherein an annular portion of the insulation over-mold defines the inlet and extends axially away from the distal end, wherein the electrical insulation over-mold extends over the gasket or O-ring located in the groove;
attaching a first metal component to the proximal end of the dielectric fitting; and
attaching a second metal component to the distal end of the dielectric fitting such that the annular portion of the insulation over-mold is received by the second metal component.

17. The method of providing dielectric protection according to claim 16 including securing the insulation over-mold to the dielectric fitting by receiving at least a portion of the insulation over-mold within a plurality of spaced recesses positioned along the distal end of the metallic body.

18. The method of providing dielectric protection according to claim 16 including securing the electrical insulation over-mold to the dielectric fitting by extending an annular member axially away from the distal end of the metallic body and covering the annular member with the annular portion of the electrical insulation over-mold such that the annular member and the annular portion of the electrical insulation over-mold are configured to be received within the second metal component.

* * * * *